UNITED STATES PATENT OFFICE 2,017,773

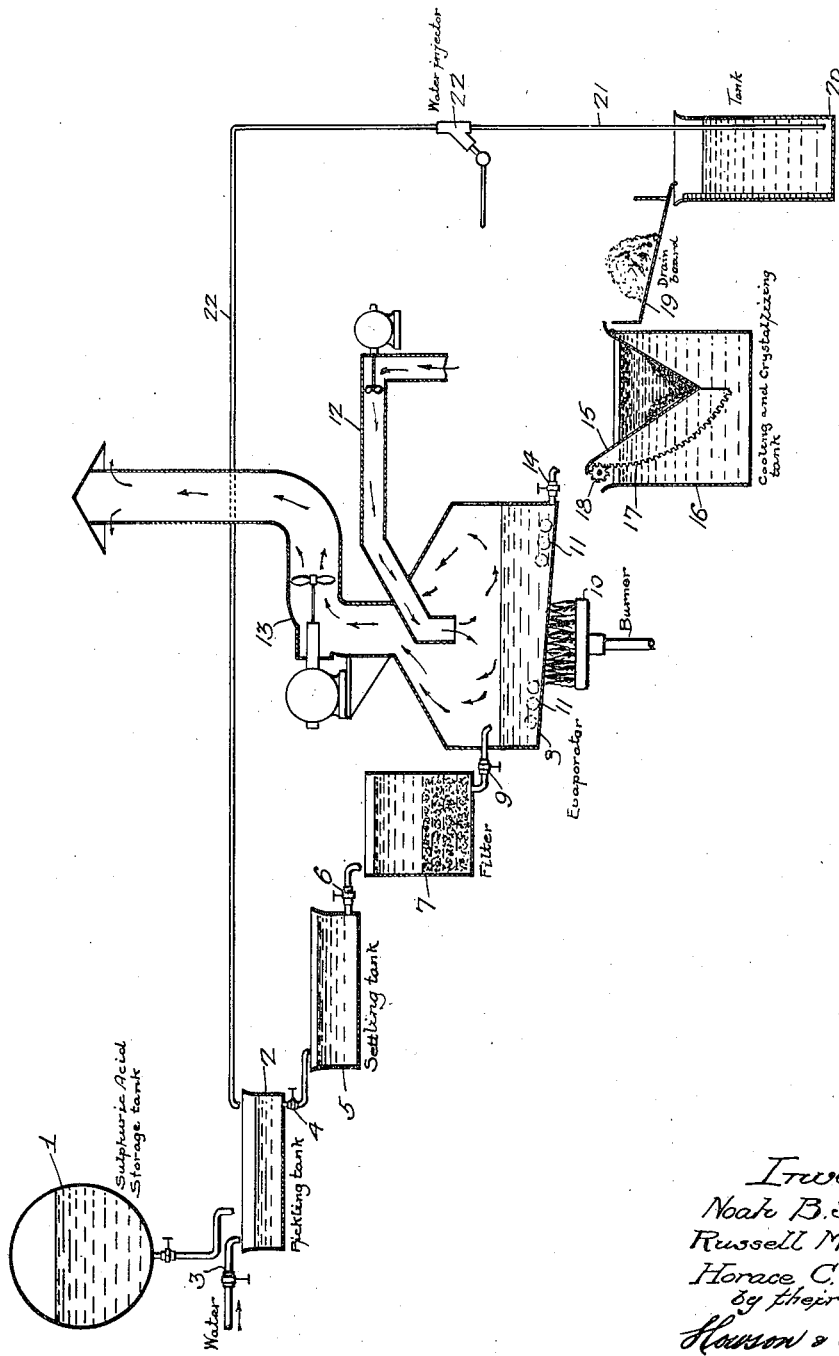

PROCESS OF RECOVERING WASTE PICKLING SOLUTIONS

Noah B. Smith, Russell M. Berry, and Horace C. Knerr, Philadelphia, Pa.

Application August 2, 1932, Serial No. 627,250

3 Claims. (Cl. 23—126)

The process of the present invention relates to the treatment of waste pickling solutions, and more particularly it relates to the recovery of the valuable unused acid, pickling inhibitor and dissolved iron salts from waste pickling liquors.

One object of our invention is to provide a process by which it is possible to recover from waste pickling solutions, in an expeditious manner, the valuable constituents thereof with the separation of the ferrous sulphate from the acid, whereby the acid in a purified condition may be returned to the pickling tank for further use.

A further object of our invention is to provide a process for the treatment of waste pickling solutions which results in an economical utilization thereof with accompanying increase in the speed of the pickling process and which obviates the difficulties now encountered in their disposal.

Still another object of the invention is to provide a process for reclaiming waste pickling solutions in which the compounds recovered, as the result of the treatment, may be utilized, and thus be made to bear at least a part of the cost of the reclamation.

Another object of our invention is to provide a process for the disposal of waste pickling solutions which neither involves the pollution of rivers and streams by an acid solution, nor the transformation of the compounds found in the solutions into other forms less objectionable from the standpoint of pollution.

Other objects will be apparent from a consideration of the specification and claims.

In the attached drawing, we have shown diagrammatically one system which may be used in carrying out the process of the present invention. Our invention is capable of being accomplished in various types of apparatus and the accompanying drawing is merely illustrative.

In the fabrication of iron or steel, or objects made therefrom, the surfaces become oxidized to some extent, particularly after the use of the various metallurgical processes involving the heating of the metal. The oxidation of the surface results in the formation of iron oxide, known in the trade as scale or rust, which is subsequently removed by the so-called pickling processes in which hot dilute solutions of sulphuric acid are employed. The pickling acid removes the scale partially by dissolving it and partially by the action of the acid on the metal beneath the scale, resulting in the liberation of hydrogen, which loosens the scale. An inhibitor is usually employed with the pickling solution in order to check the action of the sulphuric acid and prevent it from attacking the metal after the scale has been removed. The inhibitor prevents the metal from becoming pitted and corroded, and results in a reduction in the amount of steel dissolved and in the amount of acid consumed.

In general, fresh pickling solutions are prepared by the introduction, into pickling tanks, of a known volume of water and a measured volume of concentrated sulphuric acid so that the resulting pickling solution contains approximately 5% by volume, or 9% by weight, of sulphuric acid. An inhibitor is then added in proportion to the amount of acid present and the pickling bath is heated to approximately 80 degrees C. The iron or steel is immersed in this hot acid solution until the scale or rust is removed.

In the removal of the scale or rust from the surface of the iron or steel, acid is consumed with the formation of ferrous sulphate in solution and the liberation of hydrogen gas. Consequently, in the solution, the strength of the acid constantly grows weaker while the concentration of ferrous sulphate is continuously increased. Fresh acid is added from time to time to the pickling solution to replace the acid consumed until the iron concentration in the solution reaches approximately 7%, at which point the bath is relatively passive in its pickling action regardless of the strength of the acid. For this reason, as the iron content of the solution increases, the passivating action of the iron in the bath increases, so that further additions of acid become less and less effective until a point is reached when it is necessary to discard the pickling solution and prepare a fresh bath. In the prior practices, since all the unused acid in the pickling solution represents a loss, the pickling process is carried on in the contaminated baths as long as possible even though the time required in the pickling step becomes longer and longer. For example, with a fresh pickling solution, the time required for pickling may be ten to fifteen minutes, while, with a bath containing ferrous sulphate, less than that passivating the bath, the time required is oftentimes extended to forty-five minutes, or an hour.

The disposal of the waste pickling solutions presents an industrial problem, since the pollution of rivers and streams by the waste pickling baths containing sulphuric acid is objectionable. In fact, legislation in many localities prevents the pollution of the streams by these solutions. In order to render the solutions less objectionable, it has been proposed to treat them with some basic material, such as lime, soda-ash, or limestone which neutralizes the sulphuric acid contained therein. In these neutralization processes, not only is the expense of the neutralizing agent a factor, but the sulphuric acid, the inhibitor and the ferrous sulphate all become industrially unavailable. The neutralization processes do not eliminate contamination of the rivers and streams by the solutions, but merely render the original components somewhat less harmful by a chemical change.

Our invention provides a simple and expedient method for disposing of waste pickling solutions and for recovering the valuable unused acid, inhibitor and ferrous sulphate therefrom. The invention also provides a process by which the waste pickling solution is purified with the removal of the ferrous sulphate, with the result that the acid in a purified form may be returned to the pickling tank and reused. The inhibitor is recovered in the same ratio as the acid, and for this reason the acid returned to the pickling bath contains the inhibitor in the correct proportions for use. Since in accordance with the present process the acid is recovered and returned to the pickling tank, it is not necessary to employ the waste pickling solution until it approaches passivity. In other words, an active pickling bath may always be employed by the mill, due to the fact that there is no loss of acid involved in the disposal of the waste pickling solution. This has been found to greatly increase the capacity of the plant, since pickling is accomplished much more rapidly in fresh solutions than in solutions containing ferrous sulphate which are more or less passive, as hereinbefore pointed out.

The present invention contemplates the evaporation of the pickling solution to a point where it is saturated at the temperature at which the evaporation is conducted. The concentrated pickling solution is then placed in a crystallizing tank in which it is cooled without agitation and is allowed to stand for an extended period until the solution is for the most part freed from ferrous sulphate by the formation in the tank of relatively large crystals of ferrous sulphate heptahydrate (FeSO$_4$7H$_2$O). The supernatant liquor is then separated from the crystal mass, and since it contains relatively pure sulphuric acid and inhibitor, it is returned to the pickling bath.

In most instances, it will be desirable to remove the suspended solid matter, such as undissolved scale and dirt prior to the evaporation of the solution. This may be accomplished by allowing the waste pickling solution to stand in a settling tank which results in the deposition of the heavier particles of suspended matter on the bottom of the tank. Thereafter the supernatant liquor from the settling tank, which may contain some extremely fine particles of suspended matter, is passed through a sand or other filter which removes the remaining solid particles, and the clear solution which results is passed to the evaporator. The evaporator may be of any suitable construction, and may be operated under reduced pressure, or at atmospheric pressure. The use of atmospheric pressure is to be preferred, since satisfactory results are obtained thereby with less complicated apparatus. The evaporator may be heated by means of steam coils, by a burner, or other source of heat, or by waste heat from annealing furnaces and the like. The evaporation is conducted at a temperature in the neighborhood of 95 degrees C. to 100 degrees C. until the saturation point of the solution is reached, which is indicated by the formation of crystals of ferrous sulphate at the surface of the liquid. The volume of the saturated liquor is approximately ¼ to ⅕ of the original volume of the waste pickling solution, depending upon the percentage of ferrous sulphate contained therein at the start of evaporation. When the saturation point is reached, the solution, while still hot, is passed into the cooling and crystalizing tank. Usually, the heat supplied to the evaporator is not shut off until the evaporator has been emptied.

In the cooling and crystallizing tank, the concentrated liquor is allowed to cool slowly in the absence of any agitation. Preferably, the cooling tank is placed in a water bath in order to facilitate the cooling step. If desired, cold brine or other cooling means may be employed in place of water. In general, the temperature of the water varies from 35 degrees F. or 40 degrees F. in the winter to 70 degrees F., or 75 degrees F. in the summer. After the temperature of the solution becomes the same as the temperature of the cooling medium, the solution is allowed to remain in the cooling tank without agitation for a relatively long time. The exact time of crystallization depends upon the temperature of the cooling means, but the crystals are allowed to grow for a period of not less than four to five hours and extending in many cases up to fifteen or twenty hours. If the solution is not allowed to stand for a sufficient length of time, there is an inefficient recovery of the ferrous sulphate. In such a case it has been found that only about two-thirds of the yield is obtained as compared with the yield that is recovered if the solution is allowed to stand without agitation for an extended period. Allowing the solution to remain in the cooling tank for an extended time also promotes crystal growth, and relatively large crystals of iron sulphate are obtained, which crystals contain the theoretical amount of water of crystallization, namely, seven molecules of water to each molecule of ferrous sulphate. Since the crystals of ferrous sulphate contain seven molecules of water, a further concentration of the acid is secured in the crystallizing tank over that obtained in the evaporator. The crystals of ferrous sulphate obtained as previously stated are relatively large, and in general, vary on the long axis from ¼ of an inch to ½ or ¾ of an inch, or even greater. The formation of these large crystals greatly facilitates the separation of the crystals from the mother liquor, since the supernatant liquor may be removed from the crystals by simple decantation, no filtering or centrifuging being, therefore, necessary although these latter means may be employed if desired. In most instances also, the crystals form a coherent mass, which adheres to the sides of the crystallizing tank. Due to the adherence of the crystals to the sides of the tank, the supernatant liquor may be easily separated from the crystals without disturbing them, by merely tilting the tank.

The sulphuric acid content of the supernatant liquor which has been separated from the crystals may vary from about 10% to about 40% by weight, depending upon the acid content of the original waste pickling solution. The supernatant liquor also contains inhibitor in direct proportion to the sulphuric acid content. The iron content of the separated liquor ordinarily varies from about 5% to 10%, depending upon the cooling temperature and other factors. The content of iron, however, is sufficiently low so that when the liquor is returned to the pickling tank, and fresh acid and water added thereto to make up the necessary volume, it is reduced to a fraction of one per cent., which amount has virtually no passivating effect on the pickling bath. The recovered supernatant liquor may be transferred to the pickling tank in any suitable manner, for example, by means of a water injector. The crystals remaining in the crystallizing tank are removed and placed on a drain board on which they are broken apart and allowed to dry, and may then be packed for marketing. Any entrained mother liquor separated from the crystals on the drain board may be added to the supernatant liquor.

In a typical case, referring to the drawing, the sulphuric acid storage tank is snown at 1, communicating with pickling tank 2. Water is supplied to the pickling tank 2 through pipe line 3 and a solution containing the desired concentration of acid and inhibitor is prepared in tank 2 and employed in the pickling process. After the pickling solution in pickling tank 2 has been used to the extent desired, valve 4 is opened and the contents of the pickling tank are run into settling tank 5, where the heavier particles of suspended matter are deposited on the bottom of the tank. The supernatant liquor from settling tank 5 passes through valve 6, and sand filter 7, which removes the remaining suspended matter. The clear solution resulting then flows into the evaporator 8 through valve 9. The evaporator may be of any desired design and may be heated by means of burner 10, or optionally by steam coils 11, or by waste heat from the furnaces, for example, the annealing furnaces. The rate of evaporation is accelerated if desired by blowing heated air through pipe line 12 over the surface of the liquor in the evaporator and by the removal of the vapor by a hood or blower installation shown diagrammatically in the drawing at 13. As evaporation proceeds, water is removed from the solution and the remaining liquid becomes more and more concentrated in ferrous sulphate, sulphuric acid and inhibitor. When the liquor has been reduced in volume to approximately ⅕ of its original volume, depending upon the percentage of ferrous sulphate contained in the liquor at the start of evaporation, the saturation point of the solution is reached, which is evidenced by the formation of crystals of ferrous sulphate on the surfaces of the liquid. At this point valve 14 is opened and the contents of the evaporator, while still hot, are passed into a cooling and crystallizing tank 15 which may be immersed in a tank 16 containing a cooling medium such as water.

In the cooling or crystallizing tank the concentrated liquor is allowed to cool slowly and remain in the tank for an extended period in the absence of agitation. Since the solubility of the ferrous sulphate is less in cold solutions than in hot solutions, crystallization of the ferrous sulphate occurs. The cooling in the crystallizing tank is carried on very slowly and the solution is allowed to remain in the tank for a relatively long period, as hereinbefore pointed out, in order to promote the growth of very large crystals of ferrous sulphate heptahydrate. The purpose of promoting the growth of large crystals is to facilitate the separation of the crystals from the liquor and to remove as much ferrous sulphate from the solution as possible. Furthermore, since the ferrous sulphate formed contains 7 molecules of water, water is removed from the solution, and the concentration of the solution containing the sulphuric acid and the inhibitor is increased. The crystal mass is coherent and adheres to the sides of the crystallizing tank, so that it is possible to pour off the acid solution without disturbing the crystal mass. The supernatant liquor in the crystallizing tank contains the unused acid and inhibitor with a small percentage of ferrous sulphate. After the extended crystallizing period is completed, the solution is removed in any suitable manner, preferably by the tilting of the crystallizing tank 15, by means of a gear segment 17 and gear 18. The acid solution is poured on to drain board 19 from which it flows into tank 20. The crystals are then loosened from the sides of the crystallizing tank 15 and fall upon drain board 19 where they are broken up. Any mother liquor adhering to the crystals drains from drain board 19 into tank 20. The tank 20 is provided with pipe line 21, and water injector (eductor) 22 by which the reclaimed acid is transferred to pickling tank 2.

Considerable modification is possible in the steps in the process and the equipment employed, as well as in the various physical factors involved without departing from the essential features of our invention.

We claim:

1. The process of reclaiming waste pickling solutions containing unconsumed acid and inhibitor which comprises heating the solution to approximately the boiling point and concentrating the solution until ferrous sulphate crystals at the heating temperature appear, placing said concentrated solution in a cooling and crystallizing tank, slowly cooling the solution and allowing the crystallization to continue without agitation for an extended time to obtain relatively large crystals of ferrous sulphate heptahydrate which adhere to the sides of the crystallizing tank, decanting the supernatant liquor from the crystals, and returning the recovered supernatant liquor containing acid and an inhibitor to the pickling bath, and diluting said liquor with respect to the ferrous sulphate content thereof, at any stage of the process subsequent to its recovery, to provide an effective pickling bath.

2. The process of reclaiming waste pickling solutions containing unconsumed acid and inhibitor which comprises heating the solution to approximately the boiling point and concentrating the solution until ferrous sulphate crystals at the heating temperature appear, placing said concentrated solution in a cooling and crystallizing tank, slowly cooling the solution and allowing the crystallization to continue without agitation for a period not less than four hours to obtain relatively large crystals of ferrous sulphate heptahydrate which adhere to the sides of the crystallizing tank, decanting the supernatant liquor from the crystals, and returning the recovered supernatant liquor containing acid and an inhibitor to the pickling bath, and diluting said liquor with respect to the ferrous sulphate content thereof, at any stage of the process subsequent to its recovery, to provide an effective pickling bath.

3. The process of reclaiming waste pickling solutions containing unconsumed acid and inhibitor which comprises heating the solution to approximately the boiling point and concentrating the solution until ferrous sulphate crystals at the heating temperature appear, placing said concentrated solution in a cooling and crystallizing tank, slowly cooling the solution and allowing the crystallization to continue without agitation for a period in the neighborhood of fifteen hours to obtain relatively large crystals of ferrous sulphate heptahydrate which adhere to the sides of the crystallizing tank, decanting the supernatant liquor from the crystals, and returning the recovered supernatant liquor containing acid and an inhibitor to the pickling bath, and diluting said liquor with respect to the ferrous sulphate content thereof, at any stage of the process subsequent to its recovery, to provide an effective pickling bath.

NOAH B. SMITH.
RUSSELL M. BERRY.
HORACE C. KNERR.